United States Patent
Josephsen et al.

(10) Patent No.: US 6,747,762 B1
(45) Date of Patent: Jun. 8, 2004

(54) METHOD FOR OPTIMIZING COMPRESSION OF SCANNED DATA

(75) Inventors: Mark Josephsen, Vancouver, WA (US); Daniel Klave, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/435,200

(22) Filed: Nov. 5, 1999

(Under 37 CFR 1.47)

(51) Int. Cl.[7] .............................................. H04N 1/387
(52) U.S. Cl. .................. 358/453; 358/462; 358/426.04; 358/538; 382/232
(58) Field of Search ................................. 358/426, 462, 358/430, 433, 450, 453, 538, 540, 466, 463, 539, 426.04; 382/176, 232, 239, 240

(56) References Cited

U.S. PATENT DOCUMENTS

| | | | |
|---|---|---|---|
| 4,325,085 A | 4/1982 | Gooch | |
| 4,631,598 A | 12/1986 | Burkhardt et al. | |
| 4,837,848 A | 6/1989 | Henderson et al. | |
| 5,021,891 A | 6/1991 | Lee | |
| 5,075,787 A | * 12/1991 | Shaughnessy et al. | 358/452 |
| 5,151,949 A | * 9/1992 | Miyata | 382/176 |
| 5,218,457 A | 6/1993 | Burkhardt et al. | |
| 5,333,211 A | 7/1994 | Kanda et al. | |
| 5,339,368 A | 8/1994 | Higgins-Luthman et al. | |
| 5,432,871 A | 7/1995 | Novik | |
| 5,488,483 A | 1/1996 | Murayama | |
| 5,521,641 A | 5/1996 | Kinouchi et al. | |
| 5,539,842 A | * 7/1996 | Schwartz | 382/232 |
| 5,590,222 A | 12/1996 | Kojima | |
| 5,638,498 A | * 6/1997 | Tyler et al. | 358/1.18 |
| 5,751,859 A | * 5/1998 | Howard | 382/238 |
| 5,771,340 A | * 6/1998 | Nakazato et al. | 358/1.15 |
| 5,966,468 A | * 10/1999 | Fujimoto | 382/239 |
| 6,014,458 A | * 1/2000 | Wang | 382/176 |
| 6,031,939 A | * 2/2000 | Gilbert et al. | 382/239 |
| 6,191,870 B1 | * 2/2001 | Takayanagi | 358/450 |
| 6,278,981 B1 | * 8/2001 | Dembo et al. | 705/36 |

* cited by examiner

*Primary Examiner*—Edward Coles
*Assistant Examiner*—Heather D Gibbs
(74) *Attorney, Agent, or Firm*—Marger Johnson & McCollom, PC

(57) ABSTRACT

A method for choosing a compression process for a scanned image includes scanning an image, forming a bitmap of the scanned image and selecting at least one portion of the scanned image as a compression test subject. The selected portion is selected by a variety of compression techniques and a score for each technique is assigned. The compression technique with the best score is then used to compress the entire bitmap of the scanned image.

8 Claims, 1 Drawing Sheet

METHOD FOR OPTIMIZING COMPRESSION OF SCANNED DATA

BACKGROUND OF THE INVENTION

1. Field of the Invention

This invention relates to a method of selecting a type of compression, more particularly to an automated method of selecting compression for scanned documents.

2. Background of the Invention

Many known scanners allow the user to select compression and image file formats for each scanned image. For example, U.S. Pat. No. 5,488,483, issued Jan. 30, 1996, describes a system in which a user may select between two resolution modes, either G4 or JPEG for encoding of images. Some copier/scanners have separate settings for text documents and for photos. These devices require user intervention to select the file type and the compression technique for each scanned is image. Alternately, devices use the same compression techniques for each side, or face, of a stack of documents to be scanned regardless of the content, type of images on the documents, or image file format. Such devices do not allow the user a choice of compression technique and treat all documents the same. In some cases the devices require the user to decide what type of compression technique is best for a particular document, or for a stack of documents, thus possibly not using the best compression type for some subset of the faces scanned.

Modem document scanners scan a face of a page, and form a digital image of the face. These images are often compressed for faster communications transfer, or to more efficiently store the image. On single sheet, flat bed scanners, the user places a side, or face, of a document on the scanner, selects from a variety of scan options provided by the software that is used with the device, scans the document, and selects the file format for saving the image. This process requires user intervention for each face of each document.

A second type of scanner accepts a stack of documents and automatically feeds each document onto the scanner. These devices treat each face the same and use only one type of file format and compression for every document in the stack. If the stack contains homogenous documents, this operation is a sufficient method of imaging documents. However, a document stack may contain some text pages and some images, and the known techniques do not differentiate between various types of documents. If the same compression technique is used for all documents, even where alternate compression techniques are available, it may adversely affect image quality even if it improves system performance.

Encoding of image data, either for storage or transmission or both is well known. Several examples of techniques of encoding data are directed to using a given coding technique but manipulating the parameters of the encoding process to ensure the highest image quality for a given set of operating conditions. For example, U.S. Pat. No. 5,521,641, issued May 28, 1996, describes a method of manipulating the run length encoding of a document using Huffman tables of reduced size.

U.S. Pat. No. 4,631,598, issued Dec. 23, 1986, provides a system in which variable resolution output is determined by the capabilities of the host computer of the user. It also allows display processing with windowing and compression. A continuation of this patent has also issued as U.S. Pat. No. 5,218,457, on Jun. 8, 1993.

U.S. Pat. No. 4,325,085, issued Apr. 13, 1982, describes a method of compressing data for storage or fax transmission of data. The method uses predictive coding and then checks the coding to ensure high image quality.

U.S. Pat. No. 5,339,368, issued Aug. 16, 1994, describes a method for discrete transformation of image data for storage or transmission.

U.S. Pat. No. 4,837,848, issued Jun. 6, 1989, describes a method for coding using a reference scan line selection method to ensure the most accurate encoding of an image.

U.S. Pat. No. 5,021,891, issued Jun. 4, 1991, describes an adaptive discrete cosine transform system that selects block size based upon a comparison of the transform block and sub-block coding efficiency.

Another aspect of the coding techniques is recovery of the image data without errors, or with minimal errors. For example, U.S. Pat. No. 5,333,211, issued Jul. 26, 1994, describes a method for image compression and decompression using a smoothing filter to avoid artifacts in the reconstructed image. U.S. Pat. No. 5,590,222, issued Dec. 31, 1996, describes a method for recovery of a compressed image with correction for distortion.

U.S. Pat. No. 5,432,871, issued Jul. 11, 1995, describes a compression system in which a lossy-compressed image is transmitted to a user for selection of an area of interest. When the area of interest is identified, more information about that area is transmitted to the user to correct errors in the image from the lossy compression.

Each of the patents relates to compression, however none teach or suggest the selection of a compression technique dependant on the content of the scanned image. Further, there is not provision in the current art for automatically selecting a best compression method based upon the image content, either by itself, or including factors such as system parameters, speed of compression, size of the resultant compression, and image quality.

SUMMARY OF THE INVENTION

One aspect of the invention is a method for automatically selecting a best compression method for a scanned image. The scanned image may be one page or several pages. A scanning device acquires the image and portions are selected and compressed using a variety of techniques. The user may select all or a subset of compression techniques to be used in the analysis. The result of each technique is assigned a score. The score can depend upon one or more of a group of system parameters, such as size of the resultant file, speed of compression, or quality of the image. The compression technique with the best score is then used to compress the entire bitmap of the entire image.

Alternatively, the user can select a subset of a multi-page document for the compression analysis. The subset may be selected pages or a range of pages from the document. The user would designate a compression technique for the remaining pages. In this manner, only a few pages will undergo compression analysis, the other pages will be encoded as designated by the user, such as text or graphics.

Alternatively, the user can select one page of a multi-page document for the compression analysis, and designate the compression technique chosen by the analysis for the remaining pages.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENT

Figure 1:
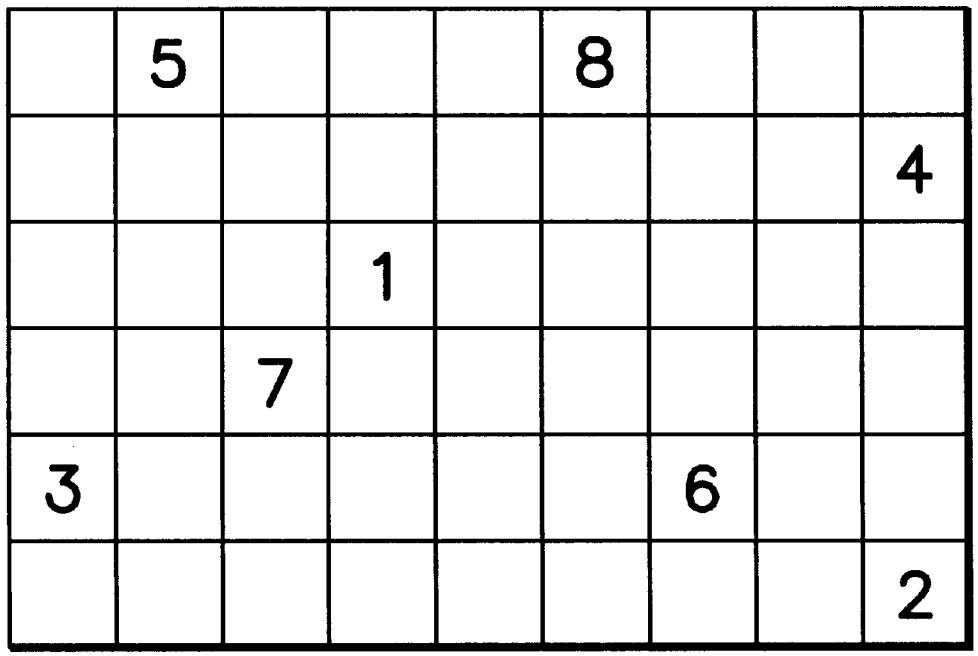
FIG. 1 shows a sample block pattern for compression testing in accordance with the invention.

Most scanners form digital representations of the object being scanned, whether text or image. These representations, called bitmaps, map the pixels of an image of an object at a given resolution. Because each pixel is represented by a number of bits, the size of the bitmap is typically very large. This size makes bitmaps impractical for transmission, given the amount of time it would take to transmit the entire bitmap in a limited bandwidth. Therefore, compression techniques are used to reduce the file size to a more manageable size, either for transmission or storage.

Many techniques exist for compressing data files of all types, including bitmaps. Two of particular relevance here are the JPEG (Joint Photographic Experts Group) and CCITT (Comite Consultatif International Telephonique et Telegraphique) standards of image compression. JPEG is a lossy compression used for photographic or other natural images, such as artwork or graphics. It can reduce the size of an image to 5% of its original, but some detail is lost. CCITT is a standard used mostly for facsimile applications across phone lines. It is primarily used for compression of text documents in facsimile machines.

As mentioned previously, most scanning devices, whether they be on fax machines, scanners, copiers or multi-function peripherals (also known as all-in-ones), handle the documents in a set manner. If more than one compression scheme is provided, it must be selected by the user, either via the software used to drive the device, or by the control panel on the device itself.

The method of the invention uses statistical sampling of compression algorithms applied to selected portions of an image to determine the most effective technique for compressing the image. The user orders (from highest to lowest) the desire for file size, speed, and image quality. This information is an input for the analysis process.

Like any statistical method, the results are not 100% perfect, however, the method may be manipulated to yield acceptable results. When used on a large number of images, the method of the invention improves the resultant size of the storage files, i.e., makes them smaller, of the images being scanned. This reduces the amount of space necessary to store the images, and therefore saves resources when the image is to be transported. There is, however, a trade-off: the method of the invention requires increased compute time. It is up to the user to determine how much time is to be allocated to the analysis process, based on the duty cycle of the scanner, and the need for compression.

The method of the invention selects portions of a bitmap, in two-dimensional blocks of a specified size and shape, and compresses the bitmap in each of the available compression types, such as CCITT Group 3 or Group 4, and JPEG. Each compression type or technique is given a score based on the user's desire for file size, compression speed or image quality. As more time is allotted for analysis, more blocks are sampled, which provide more accurate results.

In FIG. 1, a page, or face, is depicted generally at 10. Each square represents a block of pixels. A first block, block 1, is compressed by each of the compression techniques, and a score is awarded to each compression technique. The entire process is repeated for block 2, and so on until the time allotted for computing has run. Given a long run time, all the blocks may be analyzed. Given a short run time, only a few blocks will be analyzed. The compression type with the best score is used as the compression technique for that face of the document.

FIG. 1 merely provides a sample block pattern. Depending on the types of compression techniques available, the performance of a copier/scanner device may be improved by adjusting the block selection pattern, or, depending on the processor used in the device, the size of the block may be selected to optimize the speed of the compression operations. The size, number and placement, as well as the shape of the blocks may change.

It is possible that the division of the image into blocks may be directed by the compression technique running. For example, a JPEG compression may work best within a given system configuration with a block of 16×16 pixels. CCITT may work best within that same system with a block of 32×32 pixels. There is no limit to the optimization of the compression technique including the block identification, except those provided by the system designer.

Figure 2:
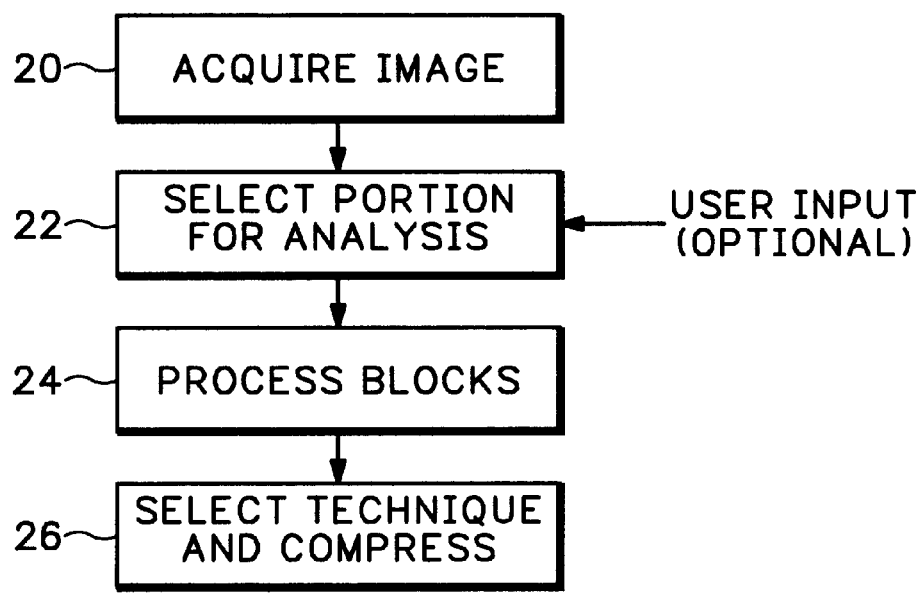
FIG. 2 is a block diagram of a method for selectively compressing scanned images in accordance with the invention.

However the division of the image is performed and whatever the size of the blocks used, a method for processing the image is shown in FIG. 2. In step 20, the system acquires an image from the scanning engine. As mentioned previously, the scanning engine can reside in a stand-alone scanner, a copier, a fax machine or a multi-function peripheral. Once the image is acquired, the process moves to step 22 in which the blocks are selected for test processing. As will be discussed in more detail below, some user input may be used here, for example, if only certain pages of a document are to be analyzed.

The blocks identified for analysis are processed by each of the compression methods available in step 24. The compression methods can be made available in several ways. They could be installed at the factory and shipped as a suite of methods with the device. They could reside in a library of methods built by the user, or provided initially and added or deleted by the user. For multi-function peripherals, the selection of the compression methods may be pre-defined for each function. For example, if the function of the peripheral selected is for faxing, the compression techniques tested could be restricted to those related to fax transmission, such as CCITT.

Within step 24, two other subprocesses occur. First, each compression technique is restricted to a given amount of time to test blocks. This may result in a varying number of blocks for each technique, as some may take longer than others to process a given block. However, the limitation on the time available for analysis prevents undue delay in processing the scanned images. The second subprocess then assigns a score for each compression technique. The score can be based upon the reduction in size, the amount of time to compress (i.e. the more blocks processed during a test period may raise the score as it will not take as long to process the image), or a combination of either of this with each other or other factors.

At step 26, the compression technique is selected based upon the score and the image is compressed. Once compressed, the image is either stored or transmitted in the appropriate file format that will allow it to be decompressed upon reception or retrieval. In this manner, the optimal compression technique based upon the user's choice of file size, compression speed or image quality is determined for each scanned image. In order to speed processing, the user may be allowed to designate how many sheets of a given type there are in the document being scanned.

For example, the document may have four pages of text, followed by two pages of mixed text and graphics, followed by two pages of graphics. The user may select CCITT for the four pages of text, compression analysis of the two pages of mixed and JPEG compression of the two pages of graphics. With this type of mixed mode compression, the user can speed up the process while still maintaining optimal compression of the document. The resulting file would then be a 'metafile' or conglomeration of the two or three file types containing all the parts of the document.

Thus, although there has been described to this point a particular embodiment for a method and structure for optimizing compression for scanned images, it is not intended that such specific references be considered as limitations upon the scope of this invention except in-so-far as set forth in the following claims.

What is claimed is:

1. A method for choosing a compression process for a scanned image comprising:
    acquiring an image as an acquired image bitmap;
    selecting at least one portion of the acquired image bitmap as a compression test subject;
    compressing the selected portion by a variety of compression techniques, wherein said variety of compression techniques includes compression techniques added by a user to a compression library;
    assigning a score to compressed data from each technique, wherein assigning a score includes a comparison of user desires versus compression results;
    determining which compression technique has the best score; and
    compressing the acquired image bitmap by the compression technique having the best score.

2. The method of claim 1 wherein said selecting includes selecting multiple portions of the scanned image, and which further includes setting a run time for said compressing the selected portion.

3. The method of claim 1 wherein said assigning a score includes determining which compression technique results in the smallest file size for the compressed data.

4. The method of claim 1 wherein said assigning a score includes determining which compression technique uses the least amount of time to compress the data.

5. The method of claim 1 wherein said assigning a score includes determining which compression technique results in the highest image quality.

6. The method of claim 1 wherein said variety of compression techniques is provided in a scanning system as shipped.

7. A method for selecting a compression process for a scanned image, comprising:
    acquiring an image of a multi-page document;
    selecting at least one portion of the acquired image as a compression test subject, wherein a user input selects a number of pages of a document for compression analysis;
    compressing the selected portion by a variety of compression techniques including compression techniques added by a user to a compression library;
    assigning a score to compressed data from each technique, wherein assigning a score includes a comparison of user desires versus compression results;
    determining which compression technique has the best score;
    compressing the entire bitmap of the number of pages by the compression technique having the best score; and
    compressing pages of the document not selected by the user input with a predefined compression technique.

8. The method of claim 7 wherein said number of pages is one page and the compression technique used for the one page is used for all pages of the document.

\* \* \* \* \*

UNITED STATES PATENT AND TRADEMARK OFFICE
CERTIFICATE OF CORRECTION

PATENT NO. : 6,747,762 B1
DATED : June 8, 2004
INVENTOR(S) : Josephsen et al.

It is certified that error appears in the above-identified patent and that said Letters Patent is hereby corrected as shown below:

<u>Column 1,</u>
Line 20, "scanned is image." should read -- scanned image. --;
Line 30, "Modem document" should read -- Modern document --.

Signed and Sealed this

Twenty-third Day of May, 2006

JON W. DUDAS
*Director of the United States Patent and Trademark Office*